US012508835B2

(12) United States Patent
Toledo

(10) Patent No.: US 12,508,835 B2
(45) Date of Patent: Dec. 30, 2025

(54) AGRICULTURAL WHEEL

(71) Applicant: Amazing Marketing Inc, Southwest Ranches, FL (US)

(72) Inventor: Nosbely Toledo, Southwest Rachches, FL (US)

(*) Notice: Subject to any disclaimer, the term of this patent is extended or adjusted under 35 U.S.C. 154(b) by 361 days.

(21) Appl. No.: 18/223,990

(22) Filed: Jul. 19, 2023

(65) Prior Publication Data

US 2025/0026143 A1 Jan. 23, 2025

(51) Int. Cl.
*B60B 3/12* (2006.01)
*B60B 3/00* (2006.01)

(52) U.S. Cl.
CPC ............... *B60B 3/12* (2013.01); *B60B 3/008* (2013.01); *B60Y 2200/22* (2013.01)

(58) Field of Classification Search
CPC ............ B60B 3/008; B60B 3/007; B60B 3/12
See application file for complete search history.

(56) References Cited

U.S. PATENT DOCUMENTS

| | | | | |
|---|---|---|---|---|
| 2,805,882 A | * | 9/1957 | Bohenek | B60B 29/001 294/26 |
| 5,053,095 A | * | 10/1991 | Hill | B60C 7/101 156/123 |
| 10,308,066 B2 | * | 6/2019 | Prezecki | B60B 3/007 |
| 10,399,382 B2 | * | 9/2019 | Welsh | B60B 15/02 |
| 2023/0347686 A1 | * | 11/2023 | Perris Magnetto | B60B 3/002 |

FOREIGN PATENT DOCUMENTS

JP 2020032812 A * 3/2020 ............... B60B 3/10

* cited by examiner

*Primary Examiner* — Jason R Bellinger
(74) *Attorney, Agent, or Firm* — Christopher J. Vandam, PA; Chris Van Dam

(57) ABSTRACT

An agricultural wheel having strengthening gussets affixed between the disc in barrel that avoid an imaginary radius between the center of the wheel through each lug bores. A handle is provided on a surface of the barrel that similarly avoids attachment points along the radii through which the lug bores are formed.

3 Claims, 3 Drawing Sheets

AGRICULTURAL WHEEL

CROSS-REFERENCES TO RELATED APPLICATIONS

None.

STATEMENT REGARDING FEDERAL SPONSORED RESEARCH OR DEVELOPMENT

None.

NAMES OF PARTIES TO A JOINT RESEARCH AGREEMENT

None.

REFERENCE TO A "SEQUENCE LISTING", A TABLE, OR A COMPUTER PROGRAM LISTING APPENDIX SUBMITTED ON COMPACT DISC AND INCORPORATION-BY-REFERENCE OF THE MATERIAL ON THE COMPACT DISCLOSURE

None.

STATEMENT REGARDING PRIOR DISCLOSURES BY AN INVENTOR OR JOINT INVENTOR

None.

BACKGROUND OF THE INVENTION

1. Field of the Invention

The present invention relates to agricultural wheels, and more particularly, to an improved metal wheel for agricultural equipment.

2. Description of Related Art Including Information Disclosed Under 37 CFR 1.97 and 37 CFR 1.98

The prior art has failed to solve the following issues: Often agricultural wheels use tandem tires that are cumbersome to remove and install, particularly while in the field. The present design allows for a single wider tire, instead of a dual tire configuration, that will more readily float on soft agricultural soils. The gussets and other features allow for a rigid and durable structure. Prior art designs are difficult to manually manipulate during the installation process. The present design includes a handle that can be used for manually picking up the tire or using straps for hoisting. The handle may cause the wheel assembly to become imbalanced. However, the low speed at which the agricultural wheel turns minimizes the impact of being imbalanced. Prior art designs fail to include structural reinforcement elements, such as the gussets and handle. Prior art designs also failed to remedy the issues created by weakening the central disc of the wheel that are solved by avoiding attaching on weakened sections of the disc caused by the several lug bores.

Several designs for agricultural vehicle wheels have been designed in the past. None of them, however, include a central disc affixed to the barrel with a series of radially oriented flanges, where the flanges are at intermediate radii between the lug bores and also include a handle affixed to the exterior wall with attachment points between the radii of the lug bores.

Applicant believes that the closest reference corresponds to common vehicle wheels used both on and off the road. However, these wheels differ from the present invention because the handle provided to assist in installation and removal of the agricultural wheel affixed to the exterior wall of the wheel and avoiding the radius through which the lug bores are formed into the disc. Additionally, the gussets between the barrel and disc improve rigidity, reduce weight and are also positioned away from the lug bore radii to enhance strength and provide improved access to the lug nuts.

Other patents describing the closest subject matter provide for a number of more or less complicated features that fail to solve the problem in an efficient and economical way. None of these patents suggest the novel features of the present invention.

A brief abstract of the technical disclosure in the specification and title are provided as well for the purposes of complying with 37 CFR 1.72 and are not intended to be used for interpreting or limiting the scope of the claims.

Without limiting the scope of the invention, a brief summary of some of the claimed embodiments of the invention is set forth below. Additional details of the summarized embodiments of the invention and/or additional embodiments of the invention may be found in the detailed description of the invention below.

BRIEF SUMMARY OF THE INVENTION

It is one of the main object of the present invention and to provide an agricultural wheel which is installed and removed from a vehicle in the field and without necessary hoists, lifts or jacks.

Is another object of this invention and to provide a lightweight agricultural wheel that can be moved and located with human power alone.

It is still another object of the present invention and to provide an agricultural wheel with increased durability by locating handle attachment points and gussets away from the radii through which lug boars are positioned.

It is yet another object of this invention to provide such a device that is inexpensive to manufacture and maintain and use, while retaining its improved effectiveness.

Further objects of the invention will be brought out in the following part of the specification, wherein detailed description is for the purpose of fully disclosing the invention without placing limitations thereon.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE SEVERAL VIEWS OF THE DRAWINGS

With the above and other related objects in view, the invention exists in the details of construction and combination of parts as will be more fully understood from the following description, when read in conjunction with the accompanying drawings in which.

DETAILED DESCRIPTION OF THE INVENTION

Figure 1:
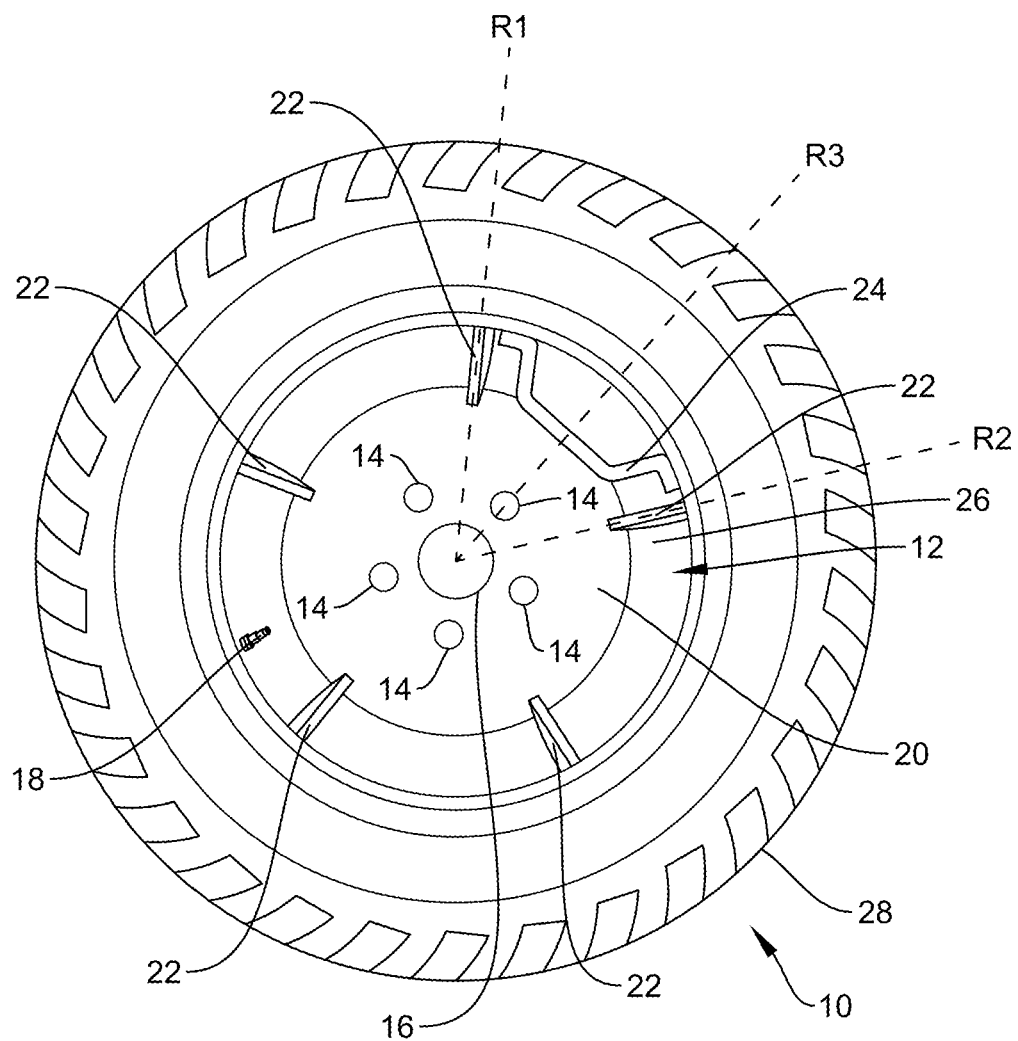
FIG. 1 shows an elevation view of an example of an agricultural wheel.

Agricultural vehicles such as wagons, trailers, tractors and a wide variety of other implements use ground contacting wheels to move on unimproved surfaces. For example, agricultural vehicles are frequently in fields, dirt roads and other locations where service and repair of equipment are unable to easily tread. As these wheels and tires require maintenance, this is frequently performed without the assistance of machinery, such as jacks or lifts, to remove and install the wheels from the vehicle.

To remove and install agricultural wheels on such unimproved locations, manpower is generally required to lift the wheels and tires for installation, removal and related maintenance. The softer soils and remote locations frequently make support machinery to change and install wheels impractical or not suited to the conditions and task without damage to the ground and risk to man and machine from the less than ideal conditions.

Additionally, the forces and stresses applied to agricultural wheels are different from typical, on-the-road tires and wheels. An agricultural wheel may experience significant lateral stresses. However, to resist the stresses additional support is needed, but the low weight needed for manual installation is also an important design consideration.

Most other prior art wheels must be precisely balanced due to the rate at which they rotate. Even a slight imbalance of a wheel may cause vibration and shorten the life of both the tire and the wheel. However, on slower agricultural wheels, such as the present design, some imbalance is tolerated. This allows the present designed to incorporate a handle affixed to the wheel to provide a fixture to aid in manipulating the wheel. This is not practical on typical higher velocity wheels.

While this invention may be practiced in many different forms, there are described in detail herein specific embodiments of the invention. This description is exemplary of the principles of the invention and is not intended to limit the invention to the particular embodiments illustrated and described.

For the purpose of this disclosure, like reference numerals in the figures shall refer to like features unless otherwise indicated or is obvious by context.

The subject device and method of use is sometimes referred to as the device, the invention, the agricultural wheel, the 'ag' wheel, the wheel, the rim, the machine or other similar terms. These terms may be used interchangeably as context requires and from use the intent becomes apparent. The masculine can sometimes refer to the feminine and neuter and vice versa. The plural may include the singular and singular the plural as appropriate from a fair and reasonable interpretation in the situation.

Referring now to the drawings, where the present invention is generally referred to with numeral 10, it can be observed that it basically includes a wheel assembly 12, a lug bore 14, an axle bore 16, a valve stem 18, a disc 20, gussets 22, a handle 24, a wall 26, a tire 28, a barrel 34, flanges 32, bead seats 34, a radius R1, a radius R2 and a radius R3.

FIG. 1 shows an elevation view of an example of the agricultural wheel. A tire 28 is affixed over the bead seat 34 of the flange 32. A valve stem 18 passes through the wall 26 allowing the tire 28 to be inflated and deflated as needed. Similar to other tires, an axle bore 16 may be provided in the center of the disc 20. The axle bore 16 supports the agricultural wheel on the vehicle or trailer axle or axle bearings.

A series of lug bores 14 penetrate through the disc the 20 and provide a means to affix the agricultural wheel to the axle hub. Generally, the axle hub will have threaded fasteners that pass through the lug bores 14. Lug nuts, not shown in the drawings, firmly attach the agricultural wheel disc 22 the axle hub.

A plurality of the gussets 22 span between the disc 20 and the barrel 30 provide rigidity and structural support of the agricultural wheel without adding significant weight. As noted above, a gusset 22 may not be possible in a higher velocity wheel because the potential imbalance could cause excessive vibration. The gussets 22 are permanently affixed between the disc 20 in the barrel 30 by welding, brazing, casting in place or other available metallurgical attachment processes.

In a version of the design, the entirety of the agricultural wheel, including gussets 22, barrel 30, wall 26 and other associated elements are made of steel. The barrel 30, along with the wall 26, bead seat 34 and flange 32 may be pressure rolled into the appropriate profile and diameter. The disc 20 is formed of a complementary diameter to fit within the barrel 30. The disc 30 is then welded onto the barrel 30. For further support, gussets 22 are then affixed between the disc 20 in the barrel 30. The gussets 22 are generally oriented along a radius of the disc 30.

Figure 2:
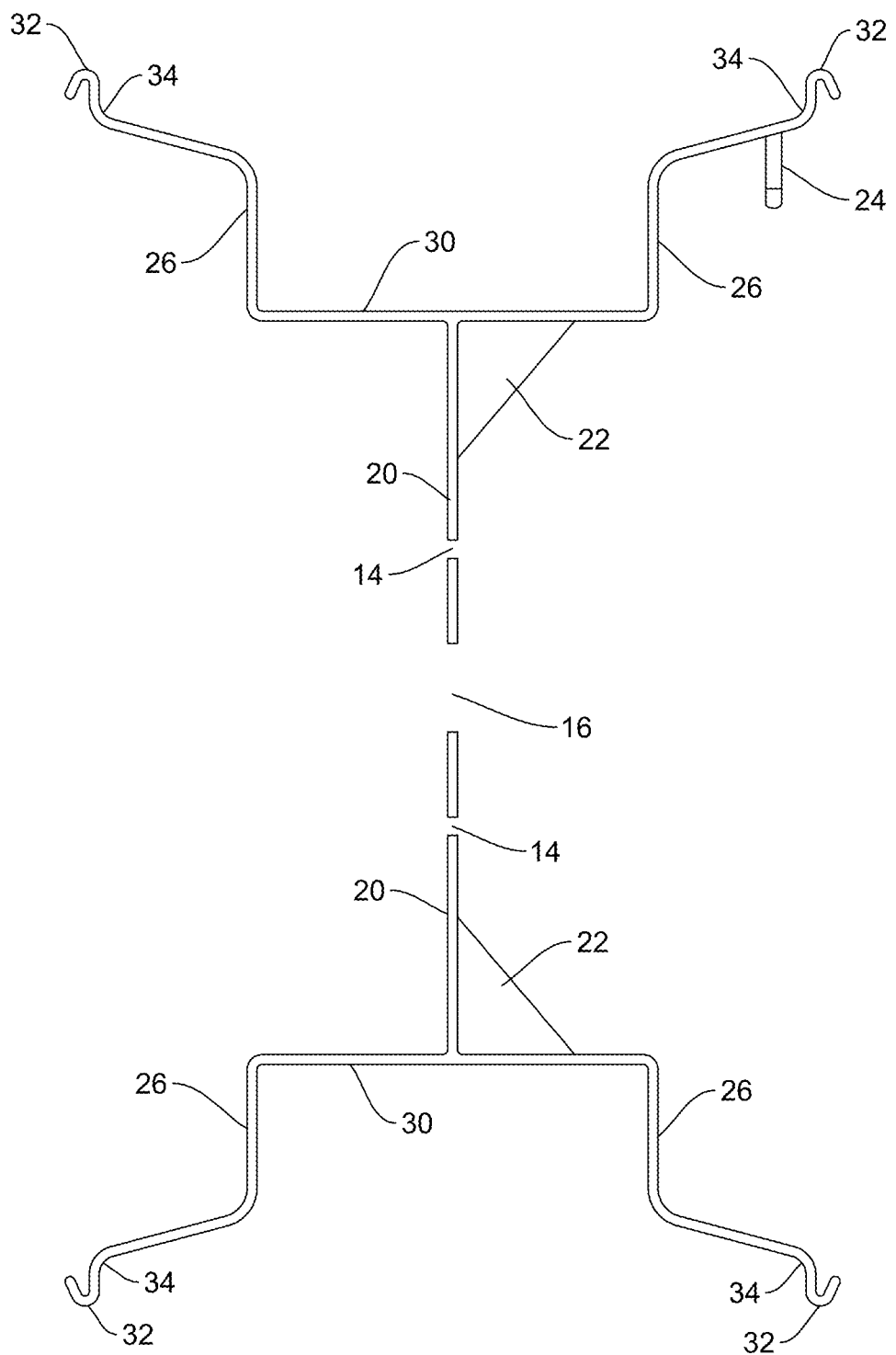
FIG. 2 shows an elevation cross section of the agricultural wheel shown in FIG. 1 with the tire removed.

At least one handle 24 is affixed to the agricultural wheel on either the wall 26, as shown in FIG. 2, or on to the disc 20. In a closely related embodiment shown in FIG. 3, the handle 24 is affixed to the wall 26 on the opposite side of the agricultural wheel as the gussets 22 are affixed. Depending on the weight of the agricultural wheel and tire combination, the mechanical equipment available to aid in installation and removal and the operator's preference, the handle 24 may be either on the inside of the agricultural wheel, closer to the body of the vehicle, or on the outside.

During the process of changing the agricultural wheel from a vehicle, the wheel may be laid flat on the ground next to the vehicle. By having the handle 24 on the outside surface of the wheel, it is exposed when the wheel is raised from the horizontal position on the ground to the vertical position immediately prior to being affixed onto the vehicle hub. This allows the installer of the wheel to continually have access to the handle 24 during the more difficult part of the installation process to manipulate the lug bores 14 over the axle lug bolts on the hub.

Generally, the gussets 22 are triangular-shaped. The gussets 22 connect the barrel 30 to the disc 22 provide rigidity. In the example shown in FIG. 1, there are five gussets 22 that match the number of lug bores 14. Imaginary radius R1 passes from the center of the axle bore 16 through a first gusset 22. Imaginary radius R2 passes from the center of the axle bore 16 through a second, adjacent gusset 22. Imaginary radius R3 passes from the axle bore 16 through the lug bore 14, between the two adjacent gussets laying on R1 and R2. In this way, the gussets 22 do not lie on a radius through any axle bore 16.

The strength of the agricultural wheel is improved by positioning the gussets 22 on radii between the lug bores 14. Similarly, the handle 24 is not affixed to the agricultural wheel on or about radius R3 passing through the lug bore 14.

The axes of rigidity along radius R1 and radius R2 are reinforced by the orientation of the corresponding gussets 22 that each have an edge along the respective radius. By avoiding the lug bore 14 along these radii R1 and R2 structural integrity is enhanced and failure potentially derived from the lug bore 14 apertures are avoided.

Figure 3:
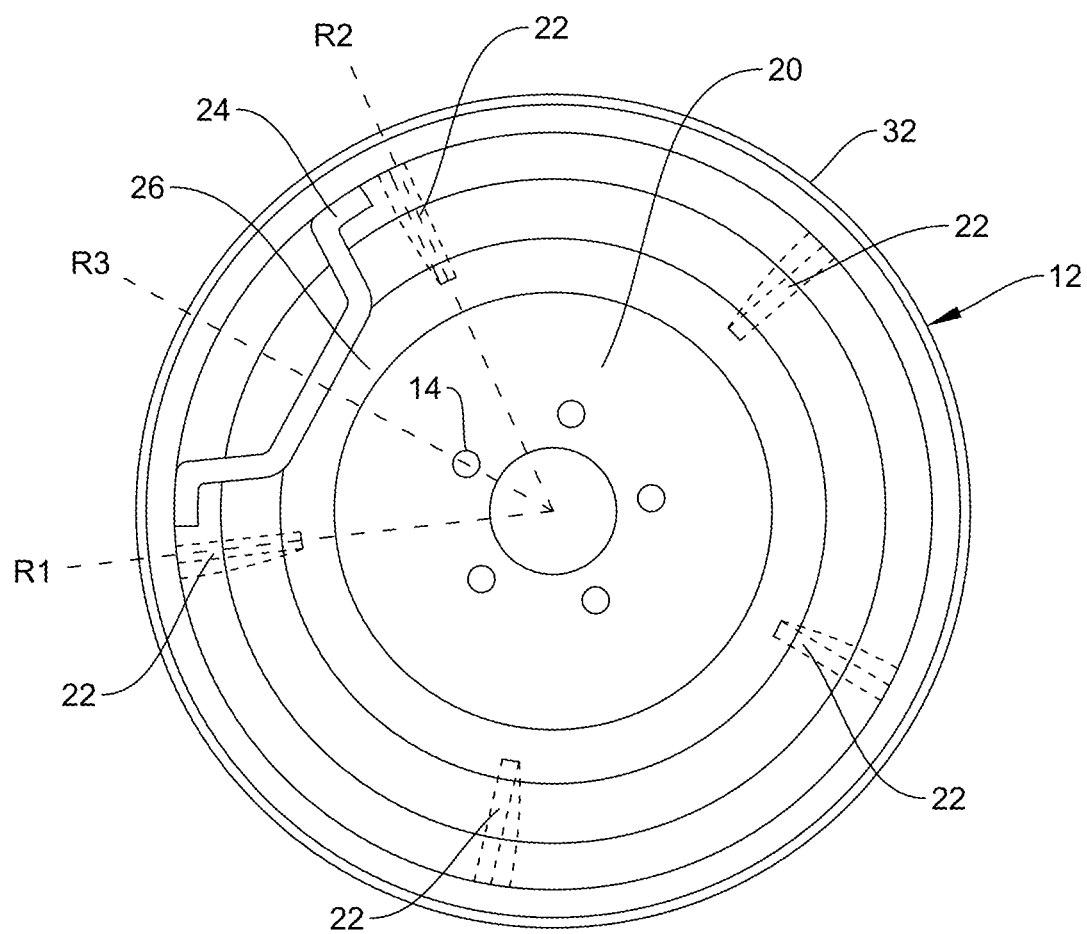
FIG. 3 shows an elevation of an alternate embodiment of an agricultural wheel.

As shown in FIG. 3, the position of the handle 24 avoids the radius R3 over the lug bore 14 benefits the structure of the wheel regardless of whether the gussets 22 are on the same side of the wheel as the handle 24. This is true because the forces acting along radius R3, passing through the lug bores 14, are avoided. The lineal strength along radii R1 and R2 is maintained through the uncompromised structure of the disc 20 by avoiding the weaker lug bores 14.

Wheels with more or less than five lug bores 14 equally fall within the inventive concept. By having a number of gussets 22 corresponding to the number of the lug bores 14, the radius R1 and R2 along which the gussets 22 are oriented can be maintained between and avoiding the radii R3 that pass through the lug bores 14. For example, having for, five, six or eight lug bores 14 may readily be utilized with an equal number of gussets 22 between the radii R3 on which the lug bores 14 are positioned.

An important version of the invention can be fairly described as an agricultural wheel comprised of, among other elements, a disc, a barrel, a handle and a plurality of gussets. The barrel is circular or toroidal shaped in that the barrel is configured to meet with the bead of a tire mounted onto the wheel. A tire will have matching beads on each of the interior edges of the tire that mate with the flange and bead seat on the exterior or circumference of the wheel. The circumference of the barrel at the bead seat matches the circumference of the inner edges of the tire so that a tight seal is formed between the bead seat on the wheel and the tire. An example of the barrel cross-section can be seen clearly in FIG. 2. The barrel, from the flange through the bead seat and wall is able to be formed on a roller press and then welded end to end to form the circular shape with the flange, bead seat and wall profiles formed therein. The disc is generally circular and fits well into the interior circumference of the barrel. The exterior circumference of the disc is then welded to the interior circumference of the barrel to form a unified wheel structure. A plurality of gussets reinforces the connection between the disc in the barrel. Generally, the orientation of the gussets is parallel to the radius of the wheel through the center point. The disc includes a plurality of the lug bores oriented around an imaginary center point of the wheel. When installing the wheel, the axle threaded lugs pass through the axle bores where a lug nut affixes the wheel to the axle. Then the axle bore through the center of the disc may also be provided to allow easier access to the axle bearings. Each lug bore lies on an imaginary lug radius emanating from the center point of the disc. It is along these lug radii that the wheel is most at risk to fail under stress. Therefore, the gussets are affixed between the barrel and the disc at approximately a midpoint between two adjacent lug radii. Similarly, the handle is affixed to the exterior surface of the barrel at attachment points that avoid landing on any lug radii. The handle may be placed on either or both sides of the disc while still avoiding attachment points along the lug radii.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

I claim:

1. An agricultural wheel comprised of a disc, a barrel, a handle and a plurality of gussets;
   the barrel is circular and is adapted on an outside edge to mount a pre-selected tire;
   the disc is circular and is affixed to an inside edge of the barrel;
   the disc has a plurality of lug bores oriented around a center point;
   each lug bore lies on a lug radius from the center point;
   a gusset is affixed to the barrel and the disc at a mid-point between adjacent lug radii;
   the handle is affixed to the barrel offset from any lug radius.

2. The agricultural wheel in claim 1, further wherein the handle is affixed to the barrel on the same side as the gussets.

3. The agricultural wheel in claim 1, further wherein the handle is affixed to the barrel on the opposite side of the gussets.

* * * * *